United States Patent
Valdevit (10) Patent No.: US 8,179,808 B2
(45) Date of Patent: *May 15, 2012

(54) NETWORK PATH TRACING METHOD

(75) Inventor: Ezio Valdevit, Redwood City, CA (US)

(73) Assignee: Brocade Communication Systems, Inc., San Jose, CA (US)

( * ) Notice: Subject to any disclaimer, the term of this patent is extended or adjusted under 35 U.S.C. 154(b) by 1184 days.

This patent is subject to a terminal disclaimer.

(21) Appl. No.: 10/699,588

(22) Filed: Oct. 31, 2003

(65) Prior Publication Data

US 2005/0094630 A1    May 5, 2005

(51) Int. Cl.
*H04L 12/26* (2006.01)

(52) U.S. Cl. .......................... 370/250; 370/252

(58) Field of Classification Search ................ None
See application file for complete search history.

(56) References Cited

U.S. PATENT DOCUMENTS

| | | | | |
|---|---|---|---|---|
| 5,844,902 A * | 12/1998 | Perlman | | 370/401 |
| 6,055,561 A * | 4/2000 | Feldman et al. | | 709/200 |
| 6,347,334 B1 * | 2/2002 | Fredericks et al. | | 709/220 |
| 6,363,077 B1 * | 3/2002 | Wong et al. | | 370/422 |
| 6,538,997 B1 * | 3/2003 | Wang et al. | | 370/241 |
| 6,671,257 B1 * | 12/2003 | Soumiya et al. | | 370/230.1 |
| 6,687,228 B1 * | 2/2004 | Fichou et al. | | 370/232 |
| 6,775,692 B1 * | 8/2004 | Albert et al. | | 709/207 |
| 6,917,986 B2 * | 7/2005 | Mor et al. | | 709/238 |
| 7,206,288 B2 * | 4/2007 | Cometto et al. | | 370/249 |
| 2003/0099194 A1 * | 5/2003 | Lee et al. | | 370/229 |
| 2003/0137978 A1 * | 7/2003 | Kanetake | | 370/386 |
| 2004/0057389 A1 * | 3/2004 | Klotz et al. | | 370/252 |
| 2004/0196787 A1 * | 10/2004 | Wang et al. | | 370/229 |
| 2005/0053006 A1 * | 3/2005 | Hongal et al. | | 370/236.2 |
| 2005/0083949 A1 * | 4/2005 | Dobbins et al. | | 370/395.53 |
| 2005/0086368 A1 * | 4/2005 | Winter | | 709/239 |
| 2005/0286551 A1 * | 12/2005 | Berman | | 370/465 |
| 2009/0028128 A1 * | 1/2009 | Trott et al. | | 370/350 |

OTHER PUBLICATIONS

"Trace Route and Ping;" McDATA(TM) Core-To-Edge Enterprise Solutions A Power Point Presentation by: Scott Kipp; Aug. 12, 2003; 16 pages.

* cited by examiner

*Primary Examiner* — Chi Pham
*Assistant Examiner* — Mohammad Adhami
(74) *Attorney, Agent, or Firm* — Wong, Cabello, Lutsch, Rutherford & Brucculeri, L.L.P.

(57) ABSTRACT

Systems and methods for gathering troubleshooting information through one or more networks are disclosed. In one embodiment, the method comprises a switch port configured to receive a frame that has information added by another switch. As the frame traverses the network, control logic in the switch adds additional information into the frame from the current switch.

82 Claims, 5 Drawing Sheets

| BIT # | NAME | COMMENT |
|---|---|---|
| 0 | PI_REVERSE_F | TRACE REVERSE PATH |
| 1 | PI_B_STATS_F | INCLUDE BASIC STATISTICS |
| 2 | PI_E_STATS_F | INCLUDE EXTENDED STATISTICS |
| 3 | PI_SRC_ROUTE_F | SOURCE ROUTING |
| 4 | PI_FLOOD_F | FLOOD |
| 5 | PI_QRY_NPORT_F | QUERY NPORT |
| 6 | PI_RESPONSE_F | RESPONSE |

NETWORK PATH TRACING METHOD

RELATED CASES

This application is related to U.S. patent application Ser. No. 10/699,603, entitled "Network Path Tracing Method for Multi-level Switches", by Josh Judd, filed concurrently herewith.

BACKGROUND

Computer networks facilitate communication between computers, servers, and stand-alone peripherals. They make possible large scale computing systems, distributed service systems, and a whole host of applications that would otherwise be infeasible. Therefore, incentives exist for the use and enhancement of computer network technology.

Storage area networks (SANs) are a popular type of computer network for accessing large volumes of data. A SAN is a networked infrastructure connecting servers to stand-alone data storage devices (e.g. disk drives) over a high-speed network. The SAN is usually a sub-network of a larger computer network that include servers and personal computers that need to access the data in the SAN. The advantages of SANs include having a large, shared storage capacity that has high bandwidth access and does not have to be accessed through a single source.

Many SANs rely on the Fibre Channel (FC) protocol. A single FC link can carry data at rates exceeding 2 gigabits per second (Gb/s) in both directions simultaneously. The FC protocol defines standard media and signaling conventions for transporting data in a serial fashion. It also provides an error correcting channel code and a frame structure for transporting the data. Further, the FC protocol sets out a buffer-credit-based flow control methodology, and creates some common services to allow proper routing of data (e.g. fabric controller, name server). The FC protocol can be applied to various network topologies including point-to-point, ring, and switched fabric.

Many FC switches provide at least some degree of automatic configurability. For example, they may automatically sense when a new inter-switch link (ISL) becomes active, and may initiate an initialization process to discover what the link connects to. The switch may automatically determine various parameters for the link (e.g. link speed). As FC networks are created, updated, maintained and de-commissioned, switches may be enabled, disabled or reconfigured, and links may be added or removed.

Routing of information between the switches will change accordingly due to a routing protocol called Fibre Channel Shortest Path First (FSPF). This protocol uses information about the "cost" of all ISLs in the network, referred to as a topology database. The cost may represent an integer greater than zero. The FSPF protocol uses the topology database to compute a routing table associated with a respective switch. This routing table exists in each switch and contains the output port a particular frame may exit the respective switch on. The routing table does not contain information regarding other switches in the fabric. When an individual switch receives a frame, the routing table is utilized to determine what port to send the frame out upon.

The time it takes a frame to traverse from its source to destination in the network is referred to as the latency of the route. In multi-switch networks, frames can be routed through numerous switches before arriving at their destination. Each switch constitutes a hop that typically adds 1 microsecond or more of latency to the route. Congested or oversubscribed routes in large networks may have latencies of more than fourteen microseconds. Congestion and over subscription of ISLs may lead to significant performance problems due to increased latency.

Since routing within the Fibre Channel has some degree of automatic configurabilty, the actual route a particular frame takes to reach its destination becomes highly variable in large networks due to switch failures and the activation of new ISLs. This variability may be complicated by the use of multiple, parallel ISLs between switches to form ultra-high bandwidth "trunks". In addition, the FSPF protocol permits load sharing among multiple, equal-cost paths. As such, multiple paths may be utilized to balance the traffic among these paths.

FC networks can grow quite large. The protocol allows for nearly $2^{24}$ (over 16 million) node ports within a single fabric (an FC network includes one or more FC fabrics). Each node port supports one FC device. As larger networks are implemented (e.g. more than about seven switches), troubleshooting performance drops becomes a daunting task. For example, ISLs and ports may become congested along particular routes, significantly reducing performance. It would be desirable to identify routing issues as a preliminary step to eliminating or mitigating the adverse effects, thereby improving the speed, efficiency, and reliability of larger networks.

TCP/IP networks often use a utility called traceroute to show the path of a packet. Basically, traceroute works by sending a series of ICMP echo packets, with the allowed hop count increasing by one for each packet. When the hop count is exceeded, the router returns an expired message. By collecting these expired messages and the ultimate echo message, in combination with the incrementing hop count, the path to the desired host can be determined. However, that and the time of each hop are all that are known. This minimal amount of information would not really assist in troubleshooting a FC SAN. Further, because traceroute operates by sending multiple, time-delayed packets, the returned path may actually be erroneous should the routing change in between packets. This further limits the potential usage of a traceroute approach in a FC SAN environment. It would be desirable to provide a mechanism to obtain greater information and avoid other problems inherent in solutions such as traceroute.

Token ring networks also include a route discovery technique that must be used if a frame must traverse multiple networks. To determine a route to an unknown destination, a source device provides a route discovery or explorer frame. This frame is fanned out to every ring in the LAN segment by the interconnecting bridges. As the frame is forwarded from one ring to the next, the bridge updates routing information in the route discovery frame by including the ring ID and bridge ID in the frame. When the frame eventually reaches the destination, the full route is contained in the frame. The destination uses this information to develop the source routing information used to provide a response frame to the source device. This source routing information is then included in every frame that goes between the two networks. While this technique addresses some of the problems of the traceroute approach, it still only provides minimal information and would be of minimal use in a FC environment. Further, in an FC environment all routes are already known due to the FSPF routing protocol, so this token ring technique would be superfluous in an FC environment.

SUMMARY

Systems and methods for gathering troubleshooting information through one or more networks are disclosed. In one embodiment, the method comprises a switch configured to receive a frame that has information added by another switch. As the frame traverses the network, control logic in the switch adds additional information into the frame from the current switch.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

A better understanding of the disclosed method can be obtained when the background and following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
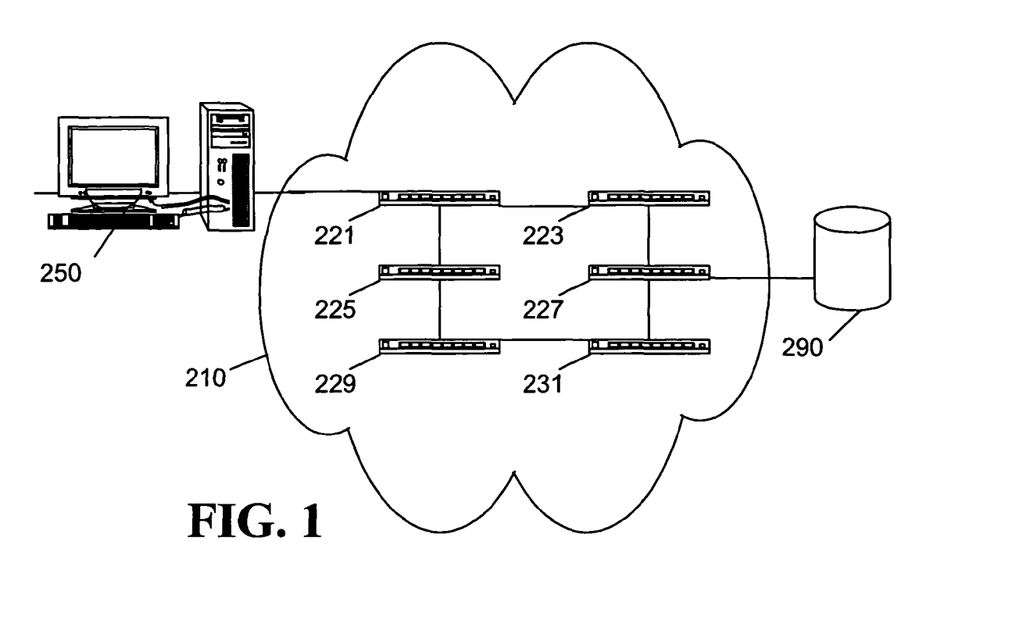
FIG. 1 shows an exemplary Fibre Channel fabric in accordance with one embodiment of the disclosed method.

FIG. 1 shows a computer system 250 coupled to a storage device 290 by a Fibre Channel (FC) fabric 210. The computer system 250 may be any suitable node device including a desktop computer, a server, or a user terminal. Storage device 290 may similarly be any suitable node device including a JBOD (Just a Bunch of Disks), RAID (Redundant Array of Inexpensive Disks) array, tape library, or network data store. FC fabric 210 is shown having six switches 221, 223, 225, 227, 229, and 231 coupled together via inter-switch links (ISLs). The switches may have as few as two and as many as 256 or more ports. The ISLs may be oversubscribed or congested due to network traffic or faulty routing. These links also may be inactivated due to a switch failure or dynamically created if a failed switch comes back online. The preferred embodiment will help reveal these network variables by gathering information from each switch in the route of a "tracer frame".

For exemplary purposes, a tracer frame as in the preferred embodiment may be issued from switch 221 to switch 227. Switch 221 may be referred to as the source of the tracer frame and switch 227 may be referred to as the destination of the tracer frame. The computer system 250 preferably connects to switch 221 and issues a single command to send out the tracer frame. As the tracer frame traverses the network, each switch may add information to the tracer frame. Note that barring network reconfiguration, the tracer frame would arrive at configured switches 221, 223, and 227 in that order. Although an alternate path exists, namely from 221, 225, 229, 231, to 227, this path may not be the shortest path according to the Fibre Channel Shortest Path First (FSPF) protocol. Therefore, switch 221 may first recognize the tracer frame and add information into the frame's payload. Then switches 223 and 227 respectively may also add information into the tracer frame's payload. This data collectively is information for solving network problems and clarifying network variability as discussed above.

If the tracer frame is addressed to an end node instead of a switch, once the tracer frame reaches its destination switch, in this case switch 227, the tracer frame may be optionally sent out to storage device 290 to determine if the pathway to storage device 290 is active and working properly and/or to obtain equivalent data from the storage device 290. Alternatively, the switch 227 can include known data about the storage device 290 without providing the frame to the storage device 290. The frame may then be returned back to its originating node, namely switch 221, by the configured switches 227, and 223 respectively. The returned frame will contain all the information added by each switch in its route. This information may include, without limitation, switch identifiers, domain/area names, ports addresses, and statistics about the switch (e.g. bytes/second, frames dropped, error rate).

Figure 2A:
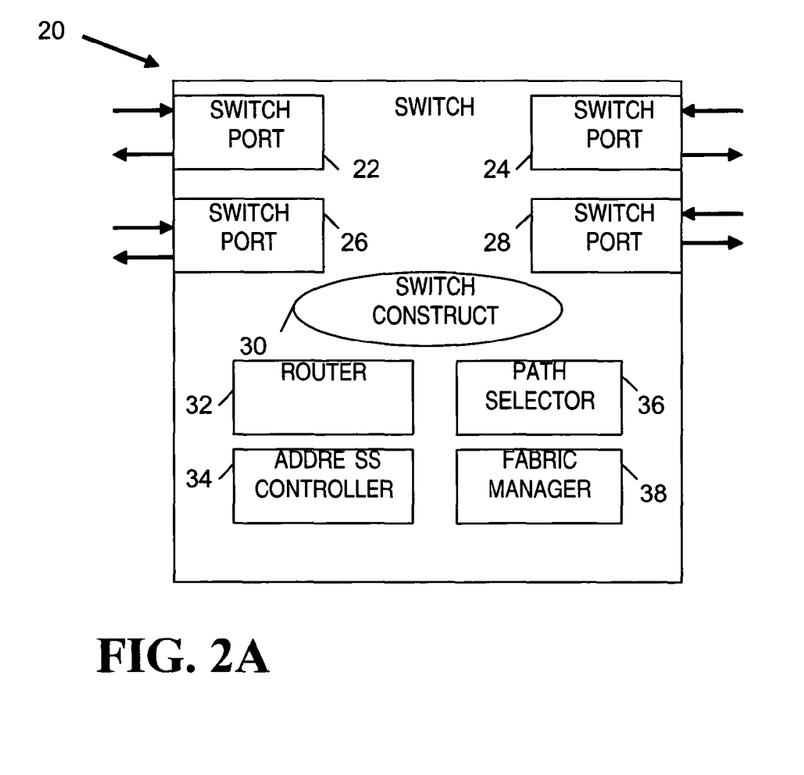
FIG. 2A shows an exemplary Fibre Channel switch and its logical components.

Of particular interest to the present disclosure are FC networks having a switched fabric topology. Switched fabric topologies are networks of switches that interconnect end-node devices. FIG. 2A illustrates a logical view of an exemplary FC switch 20 associated with a switched fabric topology. Switch 20 may comprise main components designed to ensure efficient and reliable delivery through the network: switch ports 22-28, switch construct 30, address controller 34, path selector 36, router 32, and fabric manager 38. To facilitate understanding of network path tracing method described herein, each component of switch 20 is described in turn.

Switch ports 22-28 in a switched fabric are of two primary types: E_ports and F_ports. E_ports are used to connect switches together, thereby allowing for expansion of the fabric. Switch port 24 and 28 may be of E_port type and switch 22 and 26 may be of F_port type. N_ports are used to connect node components, such as storage devices directly to the switch. Some switches have configurable ports that determine and assume the appropriate role during initialization of the switch. In essence, these roles are defined by what the port is connected to. For example, if the port on the switch is connected to an E_port of a neighboring switch, it will also be declared as E_port. If the port is connected to an end node device (N_port), it will be initialized as a F_port.

Switch construct 30 is the part of the switch responsible for internally transporting frames between switch ports 22-28. A number of technologies are available for carrying out the internal transport, including circuit switching and frame switching. Address controller 34 may be responsible for obtaining the domain ID of the switch 20 and allocating port or area IDs within this domain.

The path selector 36 and the router 32 are both logical entities that facilitate frame routing from a source to a destination within a fabric. The path selector 36 determines viable paths and performs the FSPF protocol to develop the particular paths. The router 32 may then use the output of the path selector 36 to develop its routing tables and use its routing tables to determine the appropriate path to route a frame.

The fabric manager 38 is a logical entity that performs administration of the switch 20. It may or may not be distributed as cooperative components across each of the switches. Typically, fabric manager 38 may generate statistics, such as bytes received, about the switch 20 for troubleshooting purposes. The fabric manager 38 also handles the various link services requests, both basic and extended, to help manage both the switch and the fabric.

Figure 2B:
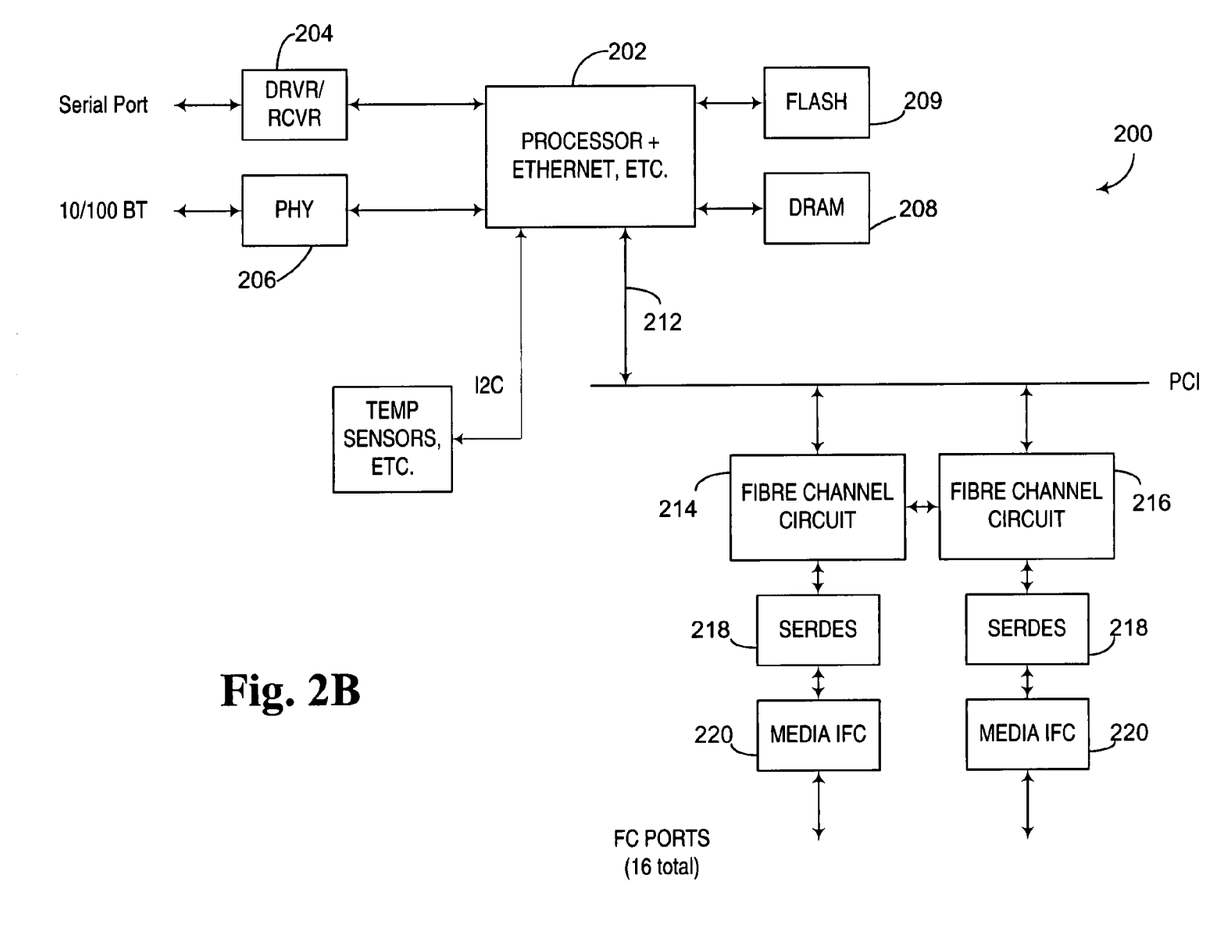
FIG. 2B shows an exemplary Fibre Channel switch and its electrical components.

FIG. 2B illustrates a basic electrical block diagram of a switch 200 according to the preferred embodiment of the present invention. A processor and I/O interface complex 202 provides the processing capabilities of the switch 200. The processor may be any of various suitable processors, including the Intel i960 and the Motorola or IBM PowerPC. The I/O interfaces may include low speed serial interfaces, such as RS-232, which use a driver/receiver circuit 204, or high-speed serial network interfaces, such as Ethernet, which use a PHY circuit 206 to connect to a local area network (LAN). Main memory or DRAM 208 and flash or permanent memory 209, are connected to the processor complex 202 to provide memory to control and be used by the processor. The various programs, such as the operating system and the fabric management and operations components are stored in the flash memory 209.

The processor complex 202 also includes an I/O bus interface 212, such as a PCI bus, to connect to Fibre Channel circuits 214 and 216. The Fibre Channel circuits 214, 216 in the preferred embodiment each contain eight Fibre Channel ports. Each port is connected to an external SERDES circuit 218, which in turn is connected to a media interface 220, which receives the particular Fibre Channel medium used to interconnect switches used to form a fabric or to connect to various devices.

Figure 3:
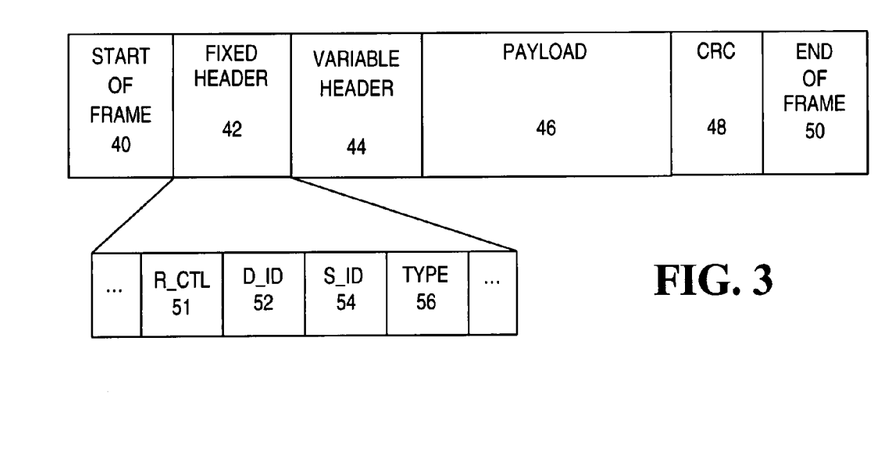
FIG. 3 shows the Fibre Channel frame format according to FC-FS standards.

FIG. 3 shows the layout of a typical Fibre Channel (FC) frame originally defined in the Fibre Channel Physical and Signaling Interface (FC-PH) standard and currently defined in the Fibre Channel Framing and Signaling (FC-FS) standard. It includes the following six fields: start of frame 40, fixed header 42, variable header 44, payload 46, cyclic redundancy check 48 (CRC), and end of frame 50.

The start of frame 40 is a sequence of four bytes used to achieve synchronization between FC devices. When a switch receives information from the transmitting switch, the receiving switch utilizes the start of frame field to identify the information that follows as a FC frame.

The fixed header 42 is a sequence of 24 bytes comprising a routing control field 51 (R_CTL) a destination address 52 (D_ID), a source address 54 (S_ID), and a frame type 56 (TYPE). These fields are utilized to determine the route a frame will take through the network. In a tracer frame, the source address field and destination address field in the fixed header 42 represent the source address of the originating switch and, in most cases, the well known address FFFFFD for the fabric controller. The originator of the frame is responsible for ensuring that these required fields are all valid upon transmission to ensure proper routing. To identify the frame as a tracer frame, the R_CTL and TYPE fields are configured to indicate the frame is an Extended Link Service (ELS) request frame. In the preferred embodiment, the tracer frame is a new ELS capability and a new ELS entry is defined. Other fields and naming conventions in the fixed header may exist.

The variable header 44 and the payload 46 share an allocated space in the frame. The variable header 44 is an optional part of the FC frame standard that is utilized for certain frame types. It can vary in size up to 64 bytes to handle additional header information as needed.

The payload 46 of the frame is where the information that is being carried in the frame is located. It can grow as large as 2,112 bytes if no variable header is included.

The Cyclic Redundancy Check 48 (CRC) is a four byte error-detecting feature of the frame structure. It ensures that if the frame becomes corrupted during transmission, the errors can be identified, allowing the frame to be retransmitted if possible. Finally, the end of frame 50 is a sequence of four bytes used to terminate a frame complying with the FC standard.

Figure 4:
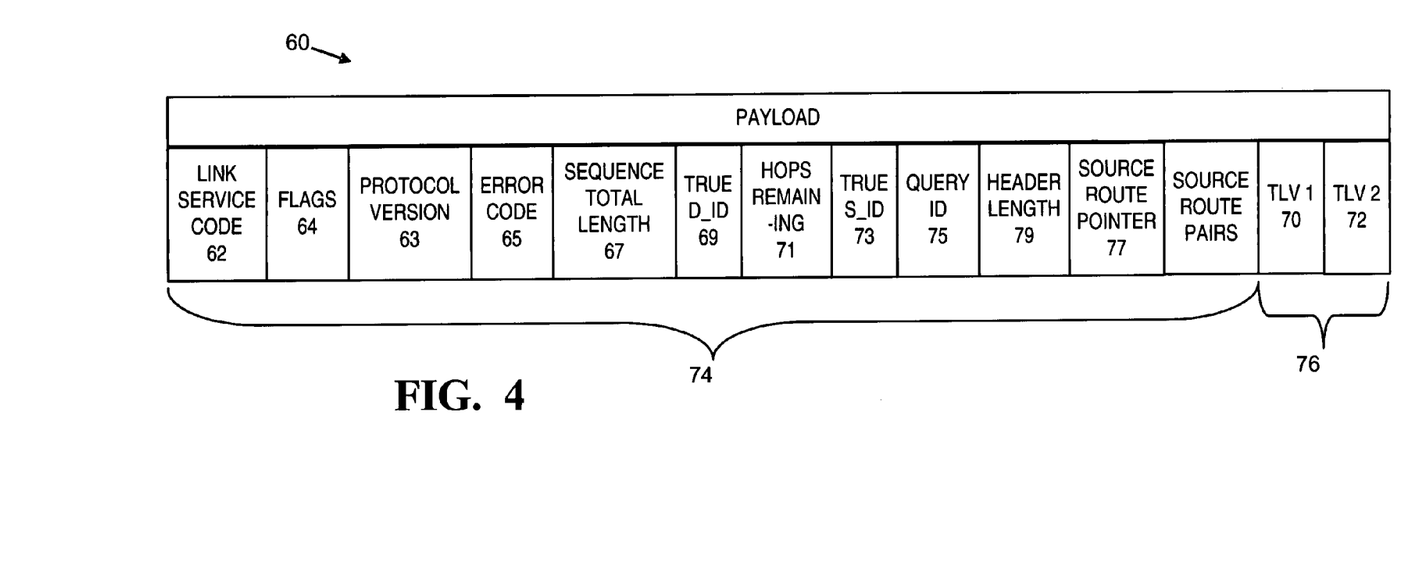
FIG. 4 shows an exemplary "tracer frame" format in accordance with one embodiment of the disclosed method.

In accordance with the preferred embodiments, a tracer frame may possess a defined layout in its payload. FIG. 4 shows the preferred layout of the payload 60 associated with tracer frame 60. The payload comprises a fixed header 74 and variable header 76. The fabric manager 38 in a configured switch examines the link service code 62 in the fixed header 74 to identify the tracer frame 60, having received the frame from the router 32 based on the determination that the frame is directed to the fabric controller as indicated by the frame D_ID of FFFFFDh. The link service code may take the form of any unique identifier that is recognized by a configured switch or other networking component. As discussed above, the tracer frame is preferably a new ELS frame, so a new link service or LS_Command Code is used. In the preferred embodiment the link service code is E1000000h, though a different value may be used. It is important to note that if a switch or other device does not recognize the type, the frame is preferably dropped. The dropping of the tracer frame ensures that if a switch has not been configured to handle the tracer frame type, the switch will simply return an error or reject and drop the frame and not cause network congestion.

In addition, tracer frame 60 has reserved space in the fixed header 74 for method options, such as those contained in "flags" 64 discussed below. In the preferred embodiment, the flags 64 comprises 7 bits used to indicate options to be carried out once the tracer frame 60 is received by a switch configured to handle the tracer frame. The next field in the fixed header 74 is preferably a protocol version 63, to allow extending the method. The next field in the fixed header 74 is preferably an error code 65, used if an error occurs and the frame is returned to the originator. The next field is preferably the sequence total length 67. The next field is preferably the true D_ID 69. This value is used by the switch in determining the final destination of the tracer frame. The next field is preferably a hops remaining value 71, so that the tracing can be limited to prevent loops in case of errors. The next field is preferably the true SID 73, which can be used when the frame is being returned to the original source. This is preferably followed by a query ID value 75, to allow request tracking. The next field is the header length 79. This points to the beginning the variable header 76. The final fields in the fixed header 74 are preferably a source route pointer 77 as described below and any source routing information.

Finally, the variable header 76 may consist of a series of Type—Length—Value (TLV) sets. These sets are preferred for their simplicity of extraction of variable length data. If the first TLV starts at the beginning of the frame payload, the second TLV will simply be the address of the previous TLV offset by its Length. Types in the sets may include addresses, zone memberships, device identifiers, statistics, and other troubleshooting information that has been defined by the method. The Value will be the digital representation of the information related to that Type. The Length will be the number of basic storage blocks (e.g. bytes) required to hold the digital representation of the Value and the Type. In the preferred embodiment new types may be added at anytime, which are simply ignored if the originating switch cannot interpret the new types. An exemplary new type would be a VSAN (virtual SAN) membership type, similar to a zone membership TLV.

When a configured switch receives the tracer frame 60, the fabric manager 38 adds to the variable header 76 at least one TLV set comprising an input port, a switch ID, a switch name, and an output port. This is a route information TLV, which preferably is always the first TLV added by a device. In addition the route information TLV may include time information, port speed, cost of the outgoing link, and the number of additional TLV sets added by the current switch. (Hereafter the adding of this route information TLV set will be termed "standard processing") Options within the method, as defined below in the flag field, will force the respective switch to add additional information into the variable header 76 of the frame again in the form of additional TLV sets.

Once the tracer frame 60 is sent into the network from its source, each switch that receives the tracer frame 60, and is properly configured, may dump information into the variable header 76 in the form of one or more TLV sets. (Hereafter the phrase "dump" refers to a real-time transfer of information from the switch to the tracer frame.) After the switch finishes dumping information, the sequence total length value 67 is updated to indicate where the next switch that receives the tracer frame 60 should dump its information. This may be done by simply adding the Length fields of all TLV sets dumped into the variable header 76 and incrementing the sequence total length value 67 by this quantity. Each switch will in a similar fashion dump the requested information into the variable header 76 of the tracer frame 60 and update pointer the sequence total length value 67. Once the tracer frame 60 reaches its destination, the frame may be returned to its source with the troubleshooting information requested in its variable header 76.

Figure 5:
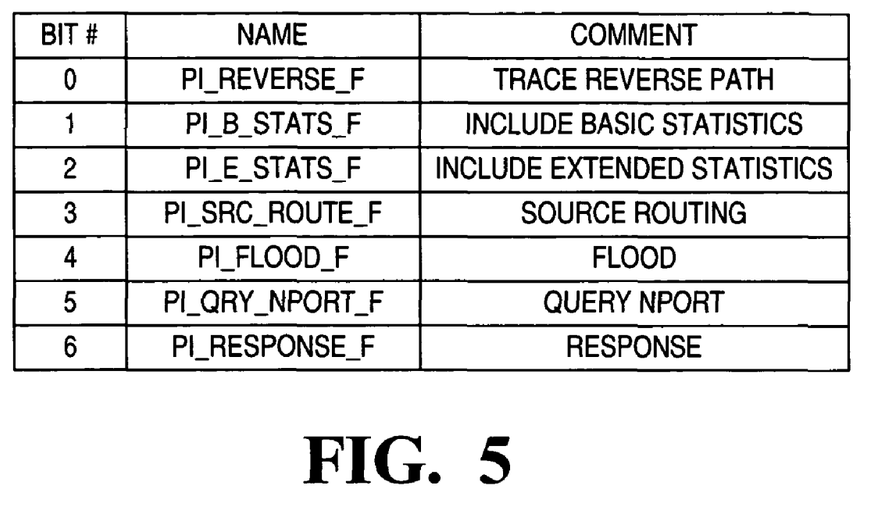
FIG. 5 shows a flag field format in accordance with one embodiment of the disclosed method.

FIG. 5 shows the layout of special flag fields that may be utilized in the preferred embodiment. These flags determine the options specified in the method and what type of additional processing and routing the tracer frame 60 will follow once a configured switch receives it. The fabric manager 38 in a configured switch is responsible for parsing the flag fields to determine which functions to perform.

If a trace reverse path (PI_REVERSE_F) flag is set, the method will trace the return path of the route in addition to the arrival route. This may or may not be the same path used in the arrival route. For example, if a new ISL becomes active during the transmission of a frame that reduces the routing cost, the new lowest cost return route would be followed according to FSPF protocol. With the trace reverse path flag set, processing of the tracer frame 60 will continue on the return path back from its destination to its source. The return response flag described below plays an integral part in allowing the return path to be traced.

A response (PI_RESPONSE_F) flag is set when the tracer frame 60 has reached its destination and is on its returning path. This flag assists a configured switch to identify whether the tracer frame 60 is on its arrival or return path. As indicated by the trace reverse path flag above, the return path may or may not be traced. This flag ensures that the configured switches have an identifier to make the arrival/return distinction in the routing process.

In an alternative embodiment the tracer frame 60 may be converted into a normal FC frame at the destination switch before being sent back on its return path. If the trace reverse path flag is set, the destination may also generate a new tracer frame to be send back through the network. This may prevent the tracer frame 60 from being dropped by a switch that is not configured with the disclosed method.

The disclosed method may dump two types of statistics. Typically, both types of statistics are stored in switch memory associated with the fabric manager 38. If a basic statistics (PI_B_STATS_F) flag is set, the method will include basic statistics about the switch it is passing through. Basic statistics preferably include the transmit and receive rates, in bytes or four byte words, for the input and output ports over a defined short period, and optionally, a long period, based on a setting in the switch and the relevant short and long time periods. The rate is preferably developed by dividing the number of bytes transmitted or received during the long or short period by the period. Additionally, in each case the value or length of the period is also included so that different periods can be used by different devices, if desired. Basic statistics also preferably include the time, the short and optionally long, period during which the link was prevented from transmitting due to lack of buffer-to-buffer credit. After standard processing, the fabric manager 38 in a configured switch preferably may transfer the basic statistics from switch memory associated with the fabric manager 38 to the variable header 76 in the form of TLV sets to the end of the sequence. The sequence total length value 67 will be accordingly updated by incrementing the pointer by the sum of all Lengths dumped into the payload. If the extended statistics (PI_E_STATS_F) flag is set, the method will include extended statistics about the switch it is passing through before standard processing occurs. The extended statistics preferably include the transmitted and received frames and words, transmitted and received frame errors and transmitted and received frame rates for a short period, and optionally a long period, for the input and output ports. The extended statistics may also include all errors on the links. The fabric manager 38 in a configured switch preferably may transfer extended statistics from the switch memory associated with the fabric manager 38 to the variable header 76. The sequence total length value 67 accordingly is updated. (Hereafter the dumping of TLV sets containing statistics will be termed "statistical processing.") It is understood that additional time periods could also be used if desired.

If a source routing (PI_SRC_ROUTE_F) flag is set, the method does not use the switches' inherent routing as defined by the FSPF specifications and its topology database. In this case, a sequence of switch ID and/or output port pairs will be included in the fixed header 74 in a source routing descriptor. The source route pointer 77 may indicate the beginning of this sequence. After standard and statistical processing, the switch may follow the source route pointer 77 value or offset into the source route pair field of the fixed header 74 and retrieve the indicated source routing switch ID and output port pair. The source route pointer 77 may be incremented by the length of the switch ID and output port pair so that the next switch that receives the trace frame 60 will process the next piece of source routing information. The switch may route the frame according to this field, bypassing its local frame routing protocols as defined by FSPF specifications. If the source routing flag is not set, the source router pointer 77 will be set to zero, indicating that no additional routing information is available and the tracer frame may be routed according to FSPF specifications and the switch's topology database. Thus, the source routing flag allows analysis of a specific route in the fabric.

In addition, by utilizing the source routing feature, part of a path may be routed by the FSPF protocol and part by the source routing information. For example, if a switch retrieves the switch ID and output port pair and the indicated switch is not directly connected to the current switch, then the source route pointer is not incremented and the frame is routed according to the FSPF protocol. When the tracer frame 60 arrives at the next switch the process is repeated. If the domain ID is directly connected, then the values are used and the source route pointer 77 is incremented. If again not directly connected, FSPF is used again. Thus only specific portions of the fabric can be analyzed.

If a flood (PI_FLOOD_F) flag is set, the method will flood the fabric with the tracer frame 60. Flooding involves taking every existing equal lowest cost forward path from that switch to its destination. In this case, the tracer frame 60 is replicated at the switch after standard and statistical processing and sent along all available paths. Multiple tracer frames therefore may be returned to the source. The exact number of frames transmitted and received will vary due to network configuration.

If a query N_port (PI_QRY_NPORT_F) flag is set, the method will cross the node port link of the destination switch. This flag will indicate to the last switch in the route whether or not the frame should be sent through the corresponding node port after basic and statistical processing. The node port may have an attached device that may or may not support the method. If the attached device supports the method, then it behaves as a switch described above, except that it will always be the destination device and responsible for returning the frame to the source. If the device does not support the method, it may provide an error return to the connected switch, which could note this failure by including a TLV in the frame and then handling the return process. This option is helpful to determine whether the actual node device, in addition to the network configuration, is working correctly.

Figure 6:
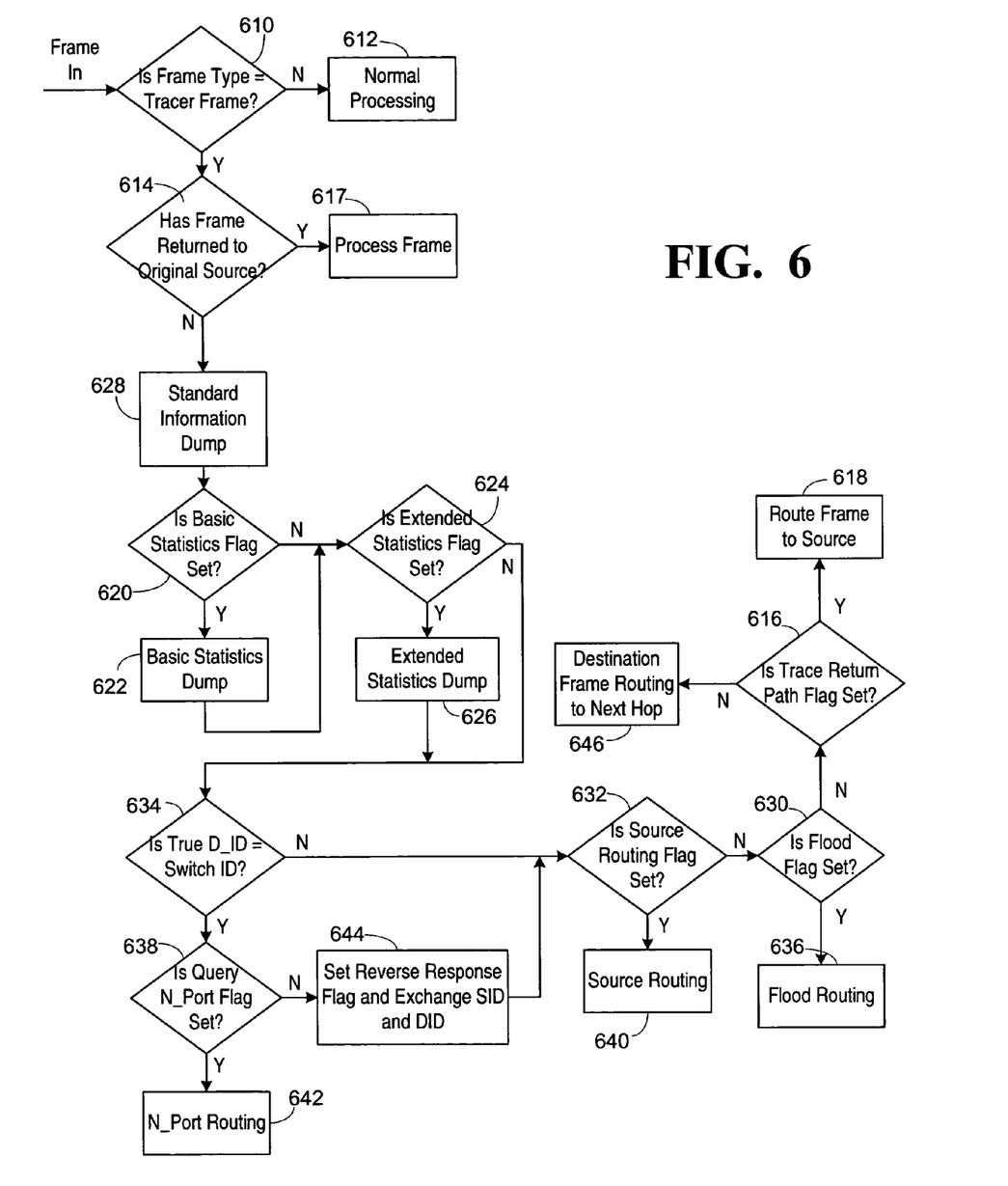
FIG. 6 shows a flow diagram of switch logic in accordance with one embodiment of the disclosed method.

FIG. 6 contains the switch control logic needed to carry out the disclosed method. In the preferred embodiment, every switch that receives the tracer frame 60 may be configured to have this control logic. If the switch does not, the switch may simply return an error and drop the unrecognized frame, ensuring congestion does not develop or simply treat the tracer frame 60 as a normal FC frame and route it to another switch accordingly. When a frame is received by a configured switch, the fabric manager 38 in the switch will parse the fixed header 74 and recognize the link service code field 62 from block 610. If the tracer frame 60 is detected, the control logic proceeds to block 614. If the comparison is not valid, the frame is not the tracer frame 60 and is passed for normal frame processing, as indicated by block 612.

After the tracer frame 60 has been identified, the fabric manager 38 checks to determine in step 614 if the trace frame has returned to its original source, this switch. This is done by checking the response flag and the true S_ID 73 or the true D_ID 69. Otherwise the frame is returned to its source without processing, as indicated in block 618. Because the D_ID value of the frame is the fabric controller well known address, the fabric manager 38 must look at either the true D_ID 69 or true S_ID 73 values. The end point switch or node can return the frame by swapping the true D_ID 69 and true S_ID 73 in the payload or leaving them in the original positions. If they are swapped, the fabric manager 38 would always look at the true D_ID 69 to determine the proper port according to FSPF.

If the values are not swapped, the fabric manager 38 determines if the response flag is set, and if so as in step 618, would use the true S_ID 73 for the routing. The fabric manager 38 would further change the D_ID of the frame to indicate the switch.

If the tracer frame has returned to its original source, it is processed in step 617. If not the original source, standard and statistical processing should occur. Standard processing will occur, represented in block 628. Blocks 620 and 622 carry out basic statistical processing by checking the basic statistics flag. Blocks 624 and 626 carry out extended statistical processing by checking the extended statistics flag.

After statistical processing occurs, the next step involves determining if the switch is the destination of the tracer frame 60, indicated in block 634. For this determination, a comparison between the destination address, the true D_ID 69 value, of the tracer frame 60 to the switch's own switch identifier is made. If they do indeed match, this switch was the destination of the frame and the query N_port flag in block 638 is checked. If the flag is set, then the tracer frame 60 will be routed through that switch's F_ports in block 642 to the attached N_port device, with the D_ID value being set to the true D_ID 69, the node D_ID value. If the flag is not set, the response flag will be set in block 644 to indicate the tracer frame 60 has reached its destination and the true D_ID 69, true S_ID 73 and S_ID values are changed according to the options described above.

If the switch is not the destination of the tracer frame 60, the comparison in block 634 will not be valid. In order to determine where the tracer frame 60 must be routed, the switch considers two cases. The first case is when the source routing flag is set in block 632, which is also the block processed after block 644. If so, the switch looks for routing information in the variable header 76 at the address indicated by source route pointer 77. The source routing pair set is then incorporated into the switch's routing and path selection functions to determine what link the frame will be transmitted as described above, as indicated by the source route processing in block 640.

When the source routing flag is not set, the switch will check the flood flag in block 630. If this flag is set, the trace frame 60 replicates and is sent along all forward ISLs, indicating flood routing procedures in block 636. If this flag is not set, the trace return path flag will be checked in block 616 to see if return path tracing is needed. If this flag is set, the frame is returned to its source without processing, as indicated in block 618. If the flag is not set, the switch routes the tracer frame 60 normally to its next hop for destination trace frame routing as indicated in block 646.

This process is continued for all switches receiving the tracer frame 60. Once the tracer frame 60 is returned to its source, at the very minimum it contains one TLV set (comprising of input port, switch ID, switch domain name, and output port) for every configured switch on the arrival route. If the return path is traced, each configured switch in the return path will also add at least one TLV set to the tracer frame 60. If the statistical processing flags are set, these statistics will also be present in the variable header 76.

If the tracer frame 60 exceeds the 2,112 bytes allowable by the FC standard, multiple tracer frames may be utilized to store the troubleshooting information according to the normal ELS convention for a sequence.

Although a Fibre Channel (FC) network was utilized in the preferred embodiment, the disclosed method could be equivalently implemented on numerous other types of network architectures. Synchronous Optical networks also employ a similar switch topology for optical communications. More information regarding Synchronous Optical standards may be found at www.iec.org/online/tutorials/sonet. Token Ring networks display a similar switch-based topology. Standards defining this network type can be found in IEEE 802.5. Fibre Distributed Data Interface (FDDI) networks were developed by the American National Standards Institute (ANSI) X3T9.5 standards committee and similarly support a switched based topology. Finally, Ethernet network standards can be found in IEEE 802.3, illustrating a switched based topology again suitable for implementation of the disclosed method.

Regardless of the network type, the disclosed method may provide direct, real-time routing information for a path with a single command. The state of the target port, the speed of every ISL along the path, and the cost of each ISL according to FSPF specifications may also be determined. Options associated with the method may allow for additional benefits including basic and extended statistics, tracing of the return path in the route, querying a N_Port of the destination switch, and flooding all paths to determine all possible paths from a source to a destination.

Numerous variations and modifications will become apparent to those skilled in the art once the above disclosure is fully appreciated. It is intended that the following claims be interpreted to embrace all such variations and modifications.

What is claimed is:

1. A Fibre Channel switch, comprising:
 a plurality of ports configured to receive and transmit a frame; and
 a fabric manager coupled to the plurality of ports to obtain the received frame and to provide the frame to be transmitted, the fabric manager configured to add information to the frame; the information including receive and transmit port identity, the switch identity, and measured transmit and receive rates of the port receiving the frame; to update a sequence total length value based on the amount of information added to the frame to indicate where a next fabric manager should add information; and to provide the frame for transmission;
 wherein the measured transmit and receive rates of the port are determined from an amount of data respectively transmitted and received by the port during a defined time period.

2. The switch of claim 1, the information further including the speed of the port receiving the frame and the link cost of a link connected to the transmit port.

3. The switch of claim 1, the information further including the port transmitting the frame.

4. The switch of claim 3, wherein the transmit and receive rates are based on a first defined time period.

5. The switch of claim 4, the information further including transmit and receive rates of the port receiving the frame and the port transmitting the frame based on a second defined time period, the second defined time period being greater than the first defined time period.

6. The switch of claim 5, the information further including the number of frames transmitted and received by the port receiving the frame and the port transmitting the frame.

7. The switch of claim 4, the information further including the number of frames transmitted and received by the port receiving the frame and the port transmitting the frame.

8. The switch of claim 1, wherein the frame has an original source and an original destination and wherein the fabric manager is configured to add the information to the frame when the frame is traveling from the original source to the original destination.

9. The switch of claim 8, wherein the fabric manager is configured to add the information to the frame when the frame is traveling from the original destination to the original source.

10. The switch of claim 1, wherein the fabric manager is configured to select the port to transmit the frame based on normal routing rules.

11. The switch of claim 10, wherein the frame contains source routing information and wherein the fabric manager is configured to select the port to transmit the frame based on the source routing information.

12. The switch of claim 11, wherein the fabric manager is configured to use normal routing rules if the source routing information does not indicate a device directly connected to the switch.

13. The switch of claim 10, wherein the frame is destination addressed to a well known address, and wherein the fabric manager is configured to determine a destination address by retrieving data from the frame payload.

14. The switch of claim 1, wherein there are a plurality of equal cost routes that can be used for transmitting the frame and wherein the fabric manager is configured to transmit the frame over all of such routes.

15. The switch of claim 1, wherein the frame is an extended link services frame.

16. The switch of claim 1, wherein the fabric manager is configured to determine if the switch is the original destination of the frame, and if so, modify the frame to cause it to return to the original source.

17. The switch of claim 1, wherein the fabric manager is configured to determine if the switch was the original source of the frame, and if so, to capture the frame and not further transmit the frame.

18. A method performed by a Fibre Channel switch, the method comprising:
 receiving a frame;
 determining measured transmit and receive rates of the port receiving the frame from the amount of data respectively transmitted and received by the port during a defined time period;
 adding information to the frame, the information including receive and transmit port identity, the switch identity, and the measured transmit and receive rates of the port receiving the frame;
 updating a sequence total length value based on the amount of information added to the frame to indicate where a next fabric manager should add information; and
 providing the frame to a port for transmission.

19. The method of claim 18, the information further including the speed of the port receiving the frame and the link cost of a link connected to the port.

20. The method of claim 18, the information further including the port transmitting the frame.

21. The method of claim 20, wherein the transmit and receive rates are based on a first defined time period.

22. The method of claim 21, the information further including transmit and receive rates of the port receiving the frame and the port transmitting the frame based on a second defined time period, the second defined time period being greater than the first defined time period.

23. The method of claim 22, the information further including the number of frames transmitted and received by the port receiving the frame and the port transmitting the frame.

24. The method of claim 21, the information further including the number of frames transmitted and received by the port receiving the frame and the port transmitting the frame.

25. The method of claim 18, wherein the frame has an original source and an original destination and the information is added to the frame when the frame is traveling from the original source to the original destination.

26. The method of claim 25, wherein the information is added to the frame when the frame is traveling from the original destination to the original source.

27. The method of claim 18, wherein the port selected to transmit the frame is based on normal routing rules.

28. The method of claim 27, wherein the frame contains source routing information and wherein the port selected to transmit the frame is based on the source routing information.

29. The method of claim 28, wherein normal routing rules are used if the source routing information does not indicate a device directly connected to the switch.

30. The method of claim 27, wherein the frame is destination addressed to a well known address, and wherein a true destination address is determined by retrieving data from the frame payload.

31. The method of claim 18, wherein there are a plurality of equal cost routes that can be used for transmitting the frame and wherein the frame is transmitted over all of such routes.

32. The method of claim 18, wherein the frame is an extended link services frame.

33. The method of claim 18, further comprising:
determining if the switch is the original destination of the frame, and if so, modifying the frame to cause it to return to the original source.

34. The method of claim 18, further comprising:
determining if the switch was the original source of the frame, and if so, to capturing the frame and not further transmitting the frame.

35. A switch, comprising:
a fabric manager configured to add information to a frame; the information including receive and transmit port identity, the switch identity, and measured transmit and receive rates of a port receiving the frame; to update a sequence total length value based on the amount of information added to the frame to indicate where a next fabric manager should add information; and to provide the frame for transmission;
wherein the measured transmit and receive rates of the port are determined from an amount of data respectively transmitted and received by the port during a defined time period.

36. The switch of claim 35, the information further including the speed of a port receiving the frame and the link cost of a link connected to a transmit port.

37. The switch of claim 35, the information further including the port transmitting the frame.

38. The switch of claim 37, wherein the transmit and receive rates are based on a first defined time period.

39. The switch of claim 38, the information further including transmit and receive rates of the port receiving the frame and a port transmitting the frame based on a second defined time period, the second defined time period being greater than the first defined time period.

40. The switch of claim 39, the information further including the number of frames transmitted and received by the port receiving the frame and the port transmitting the frame.

41. The switch of claim 38, the information further including the number of frames transmitted and received by the port receiving the frame and a port transmitting the frame.

42. The switch of claim 35, wherein the frame has an original source and an original destination and wherein the fabric manager is configured to add the information to the frame when the frame is traveling from the original source to the original destination.

43. The switch of claim 42, wherein the fabric manager is configured to add the information to the frame when the frame is traveling from the original destination to the original source.

44. The switch of claim 35, wherein the fabric manager is configured to select a port to transmit the frame based on normal routing rules.

45. The switch of claim 44, wherein the frame contains source routing information and wherein the fabric manager is configured to select the port to transmit the frame based on the source routing information.

46. The switch of claim 45, wherein the fabric manager is configured to use normal routing rules if the source routing information does not indicate a device directly connected to the switch.

47. The switch of claim 44, wherein the frame is destination addressed to a well known address, and wherein the fabric manager is configured to determine a destination address by retrieving data from the frame payload.

48. The switch of claim 35, wherein there are a plurality of equal cost routes that can be used for transmitting the frame and wherein the fabric manager is configured to transmit the frame over all of such routes.

49. The switch of claim 35, wherein the fabric manager is configured to determine if the switch is the original destination of the frame, and if so, modify the frame to cause it to return to the original source.

50. The switch of claim 35, wherein the fabric manager is configured to determine if the switch was the original source of the frame, and if so, to capture the frame and not further transmit the frame.

51. A method performed by a switch, the method comprising:
determining measured transmit and receive rates of a port receiving a frame from an amount of data respectively transmitted and received by the port during a defined time period;
adding information to the frame, the information including receive and transmit port identity, the switch identity, and the measured transmit and receive rates of the port receiving the frame;
updating a sequence total length value based on the amount of information added to the frame to indicate where a next fabric manager should add information; and
providing the frame to a port for transmission.

52. The method of claim 51, the information further including the speed of the port receiving the frame and the link cost of a link connected to the port.

53. The method of claim 51, the information further including the port transmitting the frame.

54. The method of claim 53, wherein the transmit and receive rates are based on a first defined time period.

55. The method of claim 54, the information further including transmit and receive rates of the port receiving the frame and the port transmitting the frame based on a second defined time period, the second defined time period being greater than the first defined time period.

56. The method of claim 55, the information further including the number of frames transmitted and received by the port receiving the frame and the port transmitting the frame.

57. The method of claim 54, the information further including the number of frames transmitted and received by the port receiving the frame and the port transmitting the frame.

58. The method of claim 51, wherein the frame has an original source and an original destination and the information is added to the frame when the frame is traveling from the original source to the original destination.

59. The method of claim 58, wherein the information is added to the frame when the frame is traveling from the original destination to the original source.

60. The method of claim 51, wherein the port selected to transmit the frame is based on normal routing rules.

61. The method of claim 60, wherein the frame contains source routing information and wherein the port selected to transmit the frame is based on the source routing information.

62. The method of claim 61, wherein normal routing rules are used if the source routing information does not indicate a device directly connected to the switch.

63. The method of claim 60, wherein the frame is destination addressed to a well known address, and wherein a true destination address is determined by retrieving data from the frame payload.

64. The method of claim 51, wherein there are a plurality of equal cost routes that can be used for transmitting the frame and wherein the frame is transmitted over all of such routes.

65. The method of claim 51, further comprising:
determining if the switch is the original destination of the frame, and if so, modifying the frame to cause it to return to the original source.

66. The method of claim 51, further comprising:
determining if the switch was the original source of the frame, and if so, to capturing the frame and not further transmitting the frame.

67. A switch, comprising:
means for determining measured transmit and receive rates of a port receiving a frame from an amount of data respectively transmitted and received by the port during a defined time period;
means for adding information to the frame, the information including receive and transmit port identity, the switch identity, and the measured transmit and receive rates of the port receiving the frame;
means for updating a sequence total length value based on the amount of information added to the frame to indicate where a next fabric manager should add information; and
means for providing the frame to a port for transmission.

68. The switch of claim 67, the information further including the speed of the port receiving the frame and the link cost of a link connected to the port.

69. The switch of claim 67, the information further including the port transmitting the frame.

70. The switch of claim 69, wherein the transmit and receive rates are based on a first defined time period.

71. The switch of claim 70, the information further including transmit and receive rates of the port receiving the frame and the port transmitting the frame based on a second defined time period, the second defined time period being greater than the first defined time period.

72. The switch of claim 71, the information further including the number of frames transmitted and received by the port receiving the frame and the port transmitting the frame.

73. The switch of claim 70, the information further including the number of frames transmitted and received by the port receiving the frame and the port transmitting the frame.

74. The switch of claim 67, wherein the frame has an original source and an original destination and the information is added to the frame when the frame is traveling from the original source to the original destination.

75. The switch of claim 74, wherein the information is added to the frame when the frame is traveling from the original destination to the original source.

76. The switch of claim 67, wherein the port selected to transmit the frame is based on normal routing rules.

77. The switch of claim 76, wherein the frame contains source routing information and wherein the port selected to transmit the frame is based on the source routing information.

78. The switch of claim 77, wherein normal routing rules are used if the source routing information does not indicate a device directly connected to the switch.

79. The switch of claim 76, wherein the frame is destination addressed to a well known address, and wherein a true destination address is determined by retrieving data from the frame payload.

80. The switch of claim 67, wherein there are a plurality of equal cost routes that can be used for transmitting the frame and wherein the frame is transmitted over all of such routes.

81. The switch of claim 67, further comprising:
determining if the switch is the original destination of the frame, and if so, modifying the frame to cause it to return to the original source.

82. The switch of claim 67, further comprising:
determining if the switch was the original source of the frame, and if so, to capturing the frame and not further transmitting the frame.

\* \* \* \* \*